(12) United States Patent
Yamada et al.

(10) Patent No.: US 12,409,853 B2
(45) Date of Patent: Sep. 9, 2025

(54) UNMANNED VEHICLE MANAGEMENT SYSTEM AND UNMANNED VEHICLE MANAGEMENT METHOD

(71) Applicant: Komatsu Ltd., Tokyo (JP)

(72) Inventors: Yasuyuki Yamada, Tokyo (JP); Takashi Hiranaka, Tokyo (JP); Kenta Osagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 112 days.

(21) Appl. No.: 18/271,054

(22) PCT Filed: Dec. 28, 2021

(86) PCT No.: PCT/JP2021/048910
§ 371 (c)(1),
(2) Date: Jul. 6, 2023

(87) PCT Pub. No.: WO2022/181051
PCT Pub. Date: Sep. 1, 2022

(65) Prior Publication Data
US 2024/0059314 A1 Feb. 22, 2024

(30) Foreign Application Priority Data
Feb. 24, 2021 (JP) ................. 2021-027917

(51) Int. Cl.
*B60W 60/00* (2020.01)
*B60W 30/14* (2006.01)
(Continued)

(52) U.S. Cl.
CPC ........ *B60W 60/001* (2020.02); *B60W 30/143* (2013.01); *B60W 30/18163* (2013.01);
(Continued)

(58) Field of Classification Search
CPC ........ B60W 30/143; B60W 30/18163; B60W 40/04; B60W 50/0097; B60W 60/00;
(Continued)

(56) References Cited

U.S. PATENT DOCUMENTS 9,740,208 B2 * 8/2017 Sugumaran ............ B64U 80/30
2007/0293996 A1 12/2007 Mori et al.
(Continued)

FOREIGN PATENT DOCUMENTS

JP 2002062936 A 2/2002
JP 2003-140747 A 5/2003
(Continued)

OTHER PUBLICATIONS

Scheuble et al., "Simulating Road Spray Effects in Automotive Lidar Sensor Models," 2024 IEEE Intelligent Vehicles Symposium (IV), Jeju Island, Korea, Republic of, 2024, pp. 659-666, doi: 10.1109/IV55156.2024.10588834. (https://ieeexplore.ieee.org/document/10588834) (Year: 2024).*
(Continued)

*Primary Examiner* — Atul Trivedi
(74) *Attorney, Agent, or Firm* — Troutman Pepper Locke LLP; James E. Armstrong, IV; Joshua L. Jones

(57) ABSTRACT

An unmanned vehicle management system includes: a traffic congestion prediction unit that predicts occurrence of a traffic congestion from travel situations of a plurality of unmanned vehicles traveling on a travel path at a work site; and a guidance command unit that, when occurrence of a traffic congestion is predicted, outputs a first guidance command so that an unmanned vehicle that causes the traffic congestion enters a side path branching from the travel path.

14 Claims, 11 Drawing Sheets

(51) Int. Cl.
*B60W 30/18* (2012.01)
*B60W 40/04* (2006.01)
*B60W 50/00* (2006.01)

(52) U.S. Cl.
CPC ........ *B60W 40/04* (2013.01); *B60W 50/0097* (2013.01); *B60W 2300/125* (2013.01); *B60W 2554/402* (2020.02); *B60W 2554/406* (2020.02); *B60W 2554/80* (2020.02)

(58) Field of Classification Search
CPC ......... B60W 60/001; B60W 2300/125; B60W 2554/402; B60W 2554/406; B60W 2554/80; G01C 21/34; G05D 1/6987; G05D 2105/05; G05D 2107/73; G05D 2109/10; G08G 1/01; G08G 1/09
USPC .......................................................... 701/23
See application file for complete search history.

(56) References Cited

U.S. PATENT DOCUMENTS

| | | | |
|---|---|---|---|
| 2018/0044888 A1* | 2/2018 | Chi | G06F 16/2455 |
| 2019/0113936 A1* | 4/2019 | Anderson | G08G 5/55 |
| 2020/0101974 A1* | 4/2020 | Ha | H04W 4/024 |
| 2020/0133308 A1* | 4/2020 | Raichelgauz | G08G 1/056 |
| 2021/0009160 A1* | 1/2021 | Hauser | B60W 30/0953 |
| 2021/0024144 A1* | 1/2021 | Patnaik | G01S 13/867 |
| 2021/0046499 A1* | 2/2021 | Vance | E01H 3/02 |
| 2024/0317262 A1* | 9/2024 | Tam | B60W 60/0025 |

FOREIGN PATENT DOCUMENTS

| | | | | |
|---|---|---|---|---|
| JP | 2005-301364 A | 10/2005 | | |
| JP | 2007-164280 A | 6/2007 | | |
| JP | 5984986 B1 | 9/2016 | | |
| JP | 2019-87210 A | 6/2019 | | |
| WO | WO-2019222358 A1 * | 11/2019 | ............ | G01C 21/32 |
| WO | WO-2020246319 A1 * | 12/2020 | ............ | G05D 1/0214 |

OTHER PUBLICATIONS

Wang, et al. Design and development of orchard autonomous navigation spray system. Front Plant Sci. Aug. 1, 2022;13:960686. doi: 10.3389/fpls.2022.960686. PMID: 35979071; PMCID: PMC9376256. (https://pmc.ncbi.nlm.nih.gov/articles/PMC9376256/) (Year: 2022).*

* cited by examiner

UNMANNED VEHICLE MANAGEMENT SYSTEM AND UNMANNED VEHICLE MANAGEMENT METHOD

FIELD

The present disclosure relates to an unmanned vehicle management system and an unmanned vehicle management method.

BACKGROUND

As disclosed in Patent Literature 1, an unmanned vehicle operates at a work site in a wide area such as a mine.

CITATION LIST

Patent Literature

Patent Literature 1: JP 2007-164280 A

SUMMARY

Technical Problem

At the work site, an unmanned vehicle traveling at a high speed and an unmanned vehicle traveling at a low speed may operate in a mixed manner. A traffic congestion of the unmanned vehicles may occur at the work site due to the unmanned vehicle traveling at a low speed.

An object of the present disclosure is to suppress occurrence of a traffic congestion at a work site.

Solution to Problem

According to an aspect of the present invention, an unmanned vehicle management system comprises: a traffic congestion prediction unit that predicts occurrence of a traffic congestion from travel situations of a plurality of unmanned vehicles traveling on a travel path at a work site; and a guidance command unit that, when occurrence of a traffic congestion is predicted, outputs a first guidance command such that an unmanned vehicle that causes the traffic congestion enters a side path branching from the travel path.

Advantageous Effects of Invention

According to the present disclosure, it is possible to suppress occurrence of a traffic congestion at a work site.

DESCRIPTION OF EMBODIMENTS

Hereinafter, embodiments according to the present disclosure will be described with reference to the drawings, but the present disclosure is not limited to the embodiments. The components of the embodiments described below can be appropriately combined. Furthermore, some components may not be used.

[Overview of Management System]

Figure 1:
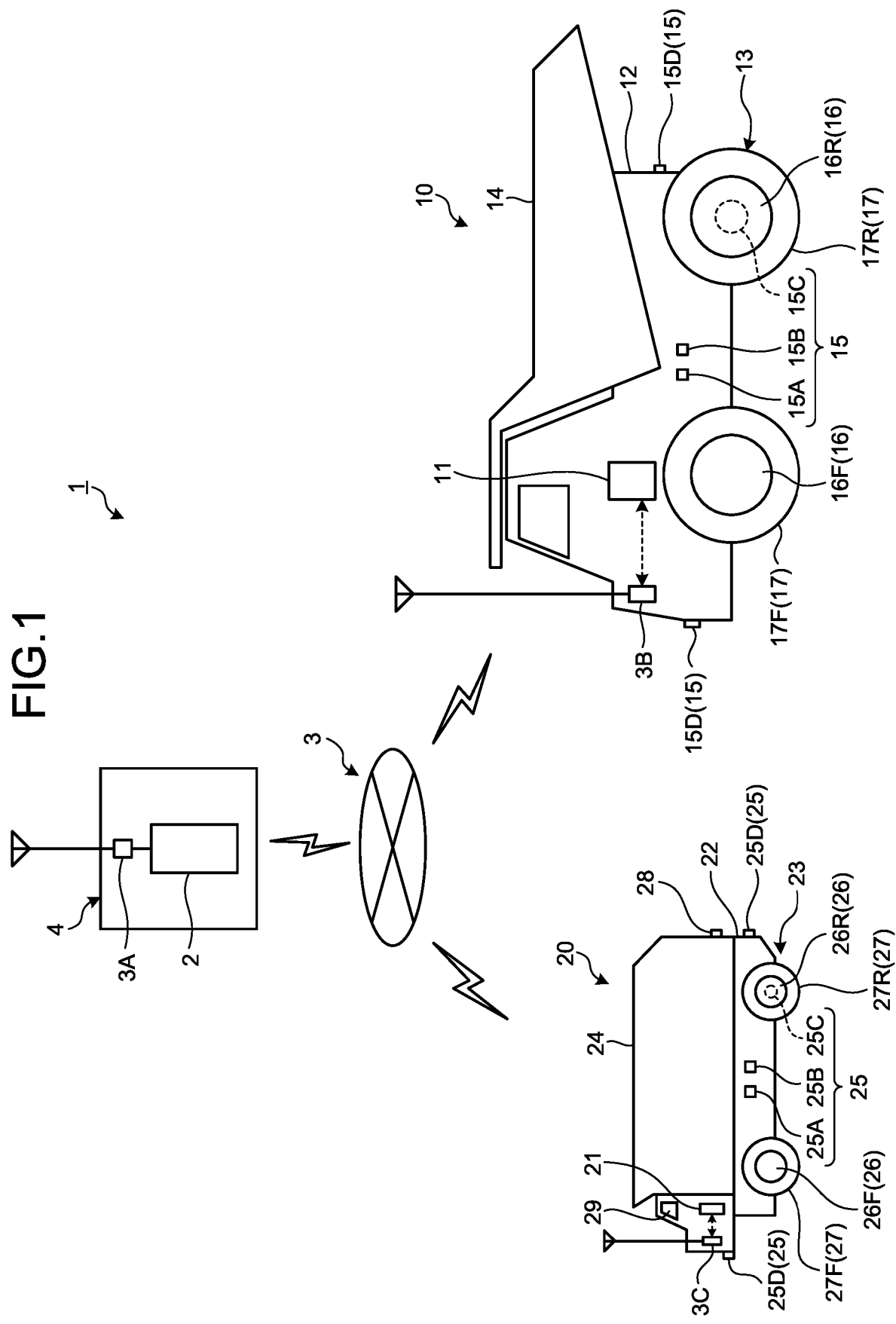
FIG. 1 is a schematic diagram illustrating a management system of a work site according to an embodiment.

FIG. 1 is a schematic diagram illustrating an unmanned vehicle management system 1 according to an embodiment. The management system 1 manages an unmanned vehicle operating at a work site. The unmanned vehicle refers to a work vehicle that operates in an unmanned manner without depending on a driving operation by a driver. In the embodiment, the unmanned vehicle operating at the work site includes a first unmanned vehicle 10 and a second unmanned vehicle 20.

In the embodiment, the first unmanned vehicle 10 is an unmanned haul vehicle. The second unmanned vehicle 20 is an unmanned water-spraying vehicle. In the following description, the first unmanned vehicle 10 is appropriately referred to as an unmanned haul vehicle 10, and the second unmanned vehicle 20 is appropriately referred to as an unmanned water-spraying vehicle 20.

The unmanned haul vehicle 10 travels in an unmanned manner at the work site to haul a load. An unmanned dump truck is exemplified as the unmanned haul vehicle 10. An excavated object excavated at the work site is exemplified as a load to be hauled to the unmanned haul vehicle 10.

The unmanned water-spraying vehicle 20 travels at the work site in an unmanned manner and sprays water. An unmanned water-spraying truck is exemplified as the unmanned water-spraying vehicle 20. The unmanned water-spraying vehicle 20 sprays water to suppress diffusion of dust or sand at the work site.

The management system 1 includes a management device 2 and a communication system 3. The management device 2 is installed in a control facility 4 of the work site. There is an administrator in the control facility 4.

The unmanned haul vehicle 10 includes a control device 11. The unmanned water-spraying vehicle 20 includes a control device 21. The management device 2, the control device 11, and the control device 21 wirelessly communicate with each other via the communication system 3. A wireless communication device 3A is connected to the management device 2. A wireless communication device 3B is connected to the control device 11. A wireless communication device 3C is connected to the control device 21. The communication system 3 includes the wireless communication device 3A, the wireless communication device 3B, and the wireless communication device 3C.

[Unmanned Haul Vehicle]

Figure 2:
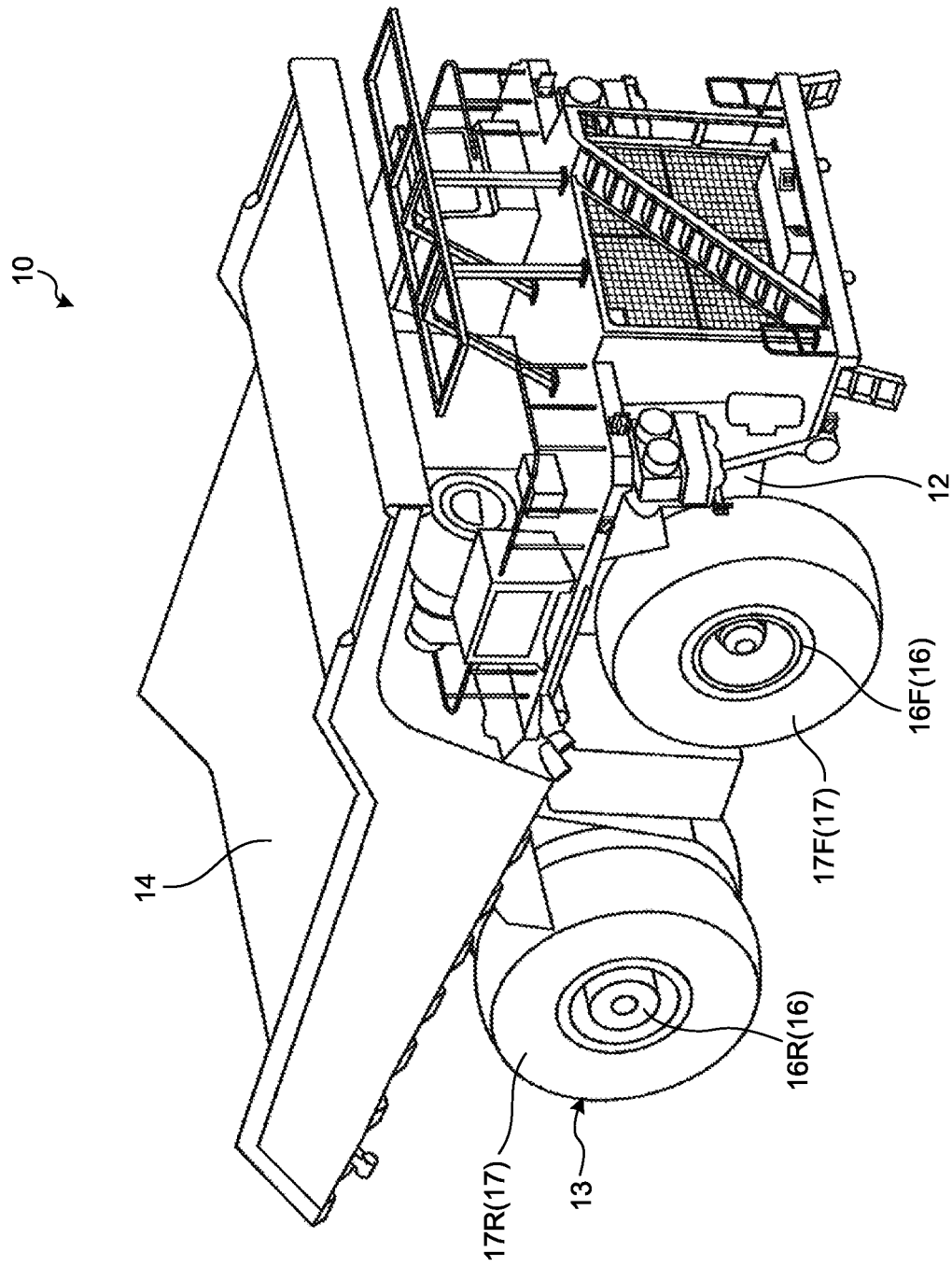
FIG. 2 is a perspective view illustrating an unmanned haul vehicle according to the embodiment.

FIG. 2 is a perspective view illustrating the unmanned haul vehicle 10 according to the embodiment. As illustrated in FIGS. 1 and 2, the unmanned haul vehicle 10 includes the wireless communication device 3B, the control device 11, a vehicle body 12, a traveling device 13, a dump body 14, and a sensor system 15.

The vehicle body 12 includes a vehicle body frame. The vehicle body 12 is supported by the traveling device 13. The vehicle body 12 supports the dump body 14.

The traveling device 13 generates a driving force for causing the unmanned haul vehicle 10 to travel. The traveling device 13 generates a braking force for decelerating or stopping the unmanned haul vehicle 10. The traveling device 13 generates a steering force for turning the unmanned haul vehicle 10. The traveling device 13 moves the unmanned haul vehicle 10 forward or backward. The traveling device 13 includes wheels 16. A tire 17 is mounted on each of the wheels 16. The wheel 16 includes a front wheel 16F and a rear wheel 16R. The tire 17 includes a front tire 17F mounted on the front wheel 16F and a rear tire 17R mounted on the rear wheel 16R. When the wheels 16 rotate in a state where the tires 17 are in contact with a road surface of the work site, the unmanned haul vehicle 10 travels through the work site.

The dump body 14 is a member on which a load is loaded. At least a part of the dump body 14 is disposed above the vehicle body 12.

The sensor system 15 includes a position sensor 15A, an orientation sensor 15B, a speed sensor 15C, and an obstacle sensor 15D. The position sensor 15A detects a position of the unmanned haul vehicle 10. The position of the unmanned haul vehicle 10 is detected using a global navigation satellite system (GNSS). The position sensor 15A includes a GNSS receiver and detects the position of the unmanned haul vehicle 10 in the global coordinate system. The orientation sensor 15B detects an orientation of the unmanned haul vehicle 10. A gyro sensor is exemplified as the orientation sensor 15B. The speed sensor 15C detects a traveling speed of the unmanned haul vehicle 10. As the speed sensor 15C, a pulse sensor that detects the rotation of the wheel 16 is exemplified. The obstacle sensor 15D detects an obstacle around the unmanned haul vehicle 10. The obstacle sensor 15D detects an obstacle in a non-contact manner. Examples of the obstacle sensor 15D include a laser sensor (light detection and ranging (LIDAR)) and a radar sensor (radio detection and ranging (RADAR)).

[Unmanned Water-Spraying Vehicle]

Figure 3:
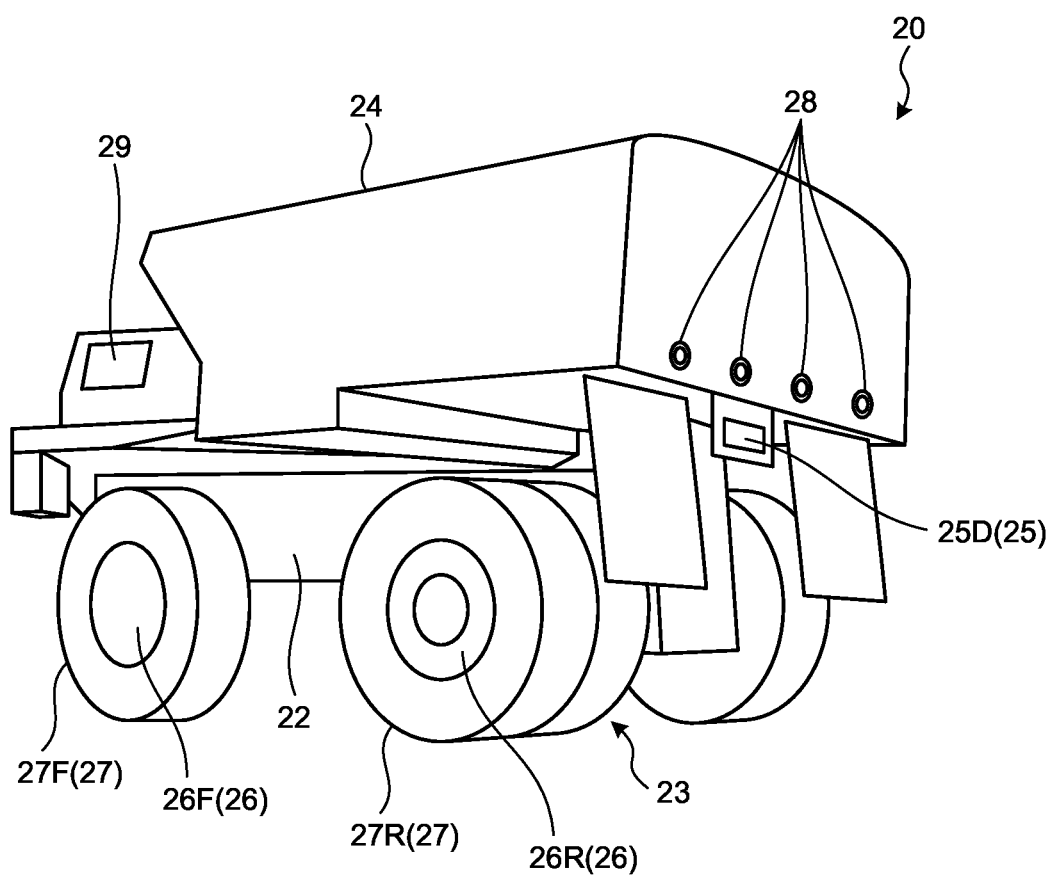
FIG. 3 is a perspective view illustrating an unmanned water-spraying vehicle according to the embodiment.

FIG. 3 is a perspective view illustrating the unmanned water-spraying vehicle 20 according to the embodiment. As illustrated in FIGS. 1 and 3, the unmanned water-spraying vehicle 20 includes the wireless communication device 3C, the control device 21, a vehicle body 22, a traveling device 23, a tank 24, a sensor system 25, and a watering spray 28.

The vehicle body 22 includes a vehicle body frame. The vehicle body 22 is supported by the traveling device 23. The vehicle body 22 supports the tank 24.

In the embodiment, a cab 29 is provided in the vehicle body 22. The cab 29 is provided at a front portion of the vehicle body 22. A driver can board the cab 29 and perform a driving operation of the unmanned water-spraying vehicle 20. For example, when performing maintenance or inspection of the unmanned water-spraying vehicle 20, the driver performs a driving operation of the unmanned water-spraying vehicle 20. In the embodiment, the unmanned water-spraying vehicle 20 operates in an unmanned manner at least when spraying water at the work site. Note that the cab 29 may not be provided in the unmanned water-spraying vehicle 20.

The traveling device 23 generates a driving force for traveling the unmanned water-spraying vehicle 20. The traveling device 23 generates a braking force for decelerating or stopping the unmanned water-spraying vehicle 20. The traveling device 23 generates a steering force for turning the unmanned water-spraying vehicle 20. The traveling device 23 moves the unmanned water-spraying vehicle 20 forward or backward. The traveling device 23 includes wheels 26. A tire 27 is mounted on each of the wheels 26. The wheel 26 includes a front wheel 26F and a rear wheel 26R. The front wheel 26F is a steering wheel, and the rear wheel 26R is a driving wheel. Note that both the front wheel 26F and the rear wheel 26R may be steering wheels. Both the front wheel 26F and the rear wheel 26R may be driving wheels. The front wheel 26F may be a drive wheel, and the rear wheel 26R may be a steering wheel. The tire 27 includes a front tire 27F mounted on the front wheel 26F and a rear tire 27R mounted on the rear wheel 26R. When the wheels 26 rotate in a state where the tires 27 are in contact with the road surface of the work site, the unmanned water-spraying vehicle 20 travels through the work site.

The tank 24 is a member that stores water for water-spraying. At least a part of the tank 24 is disposed above the vehicle body 22.

The sensor system 25 includes a position sensor 25A, an orientation sensor 25B, a speed sensor 25C, and an obstacle sensor 25D. The position sensor 25A detects a position of the unmanned water-spraying vehicle 20. The position of the unmanned water-spraying vehicle 20 is detected using a global navigation satellite system (GNSS). The position sensor 25A includes a GNSS receiver and detects the position of the unmanned water-spraying vehicle 20 in the global coordinate system. The orientation sensor 25B detects an orientation of the unmanned water-spraying vehicle 20. A gyro sensor is exemplified as the orientation sensor 25B. The speed sensor 25C detects a traveling speed of the unmanned water-spraying vehicle 20. As the speed sensor 25C, a pulse sensor that detects the rotation of the wheel 26 is exemplified. The obstacle sensor 25D detects an obstacle around the unmanned water-spraying vehicle 20. The obstacle sensor 25D detects an obstacle in a non-contact manner. Examples of the obstacle sensor 25D include a laser sensor (light detection and ranging (LIDAR)) and a radar sensor (radio detection and ranging (RADAR)).

The watering spray 28 sprays water in the tank 24. The watering spray 28 is disposed at a rear of the tank 24. The watering spray 28 sprays water behind the unmanned water-spraying vehicle 20. In the embodiment, a plurality of the watering sprays 28 is provided. The plurality of watering sprays 28 are arranged at intervals in a vehicle width direction of the unmanned water-spraying vehicle 20 at the rear of the tank 24. The vehicle width direction refers to a direction parallel to a rotation axis of the wheels 26 when the unmanned water-spraying vehicle 20 is in a straight traveling state.

[Work Site]

Figure 4:
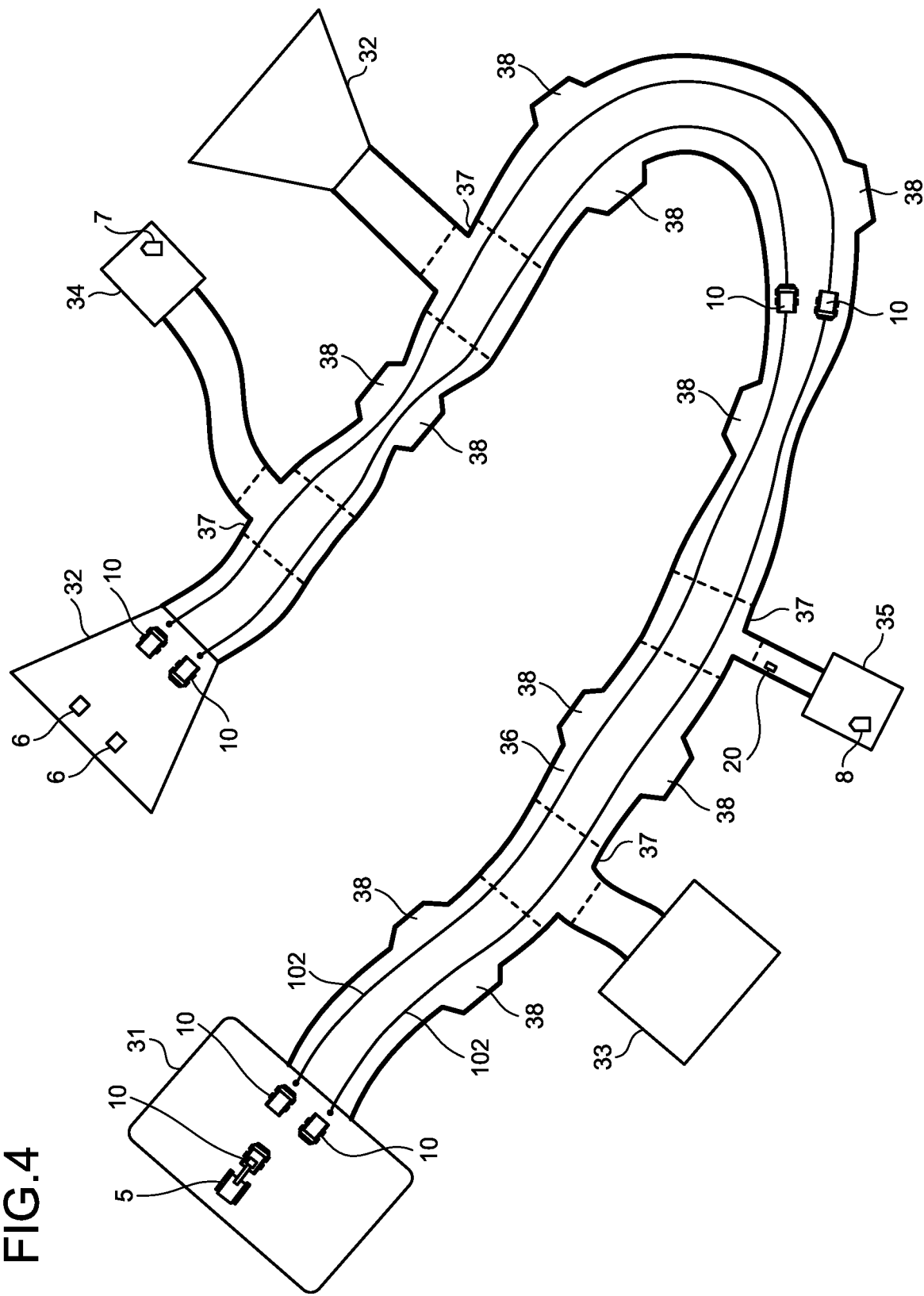
FIG. 4 is a schematic diagram illustrating a work site according to the embodiment.

FIG. 4 is a schematic diagram illustrating a work site according to the embodiment. Examples of the work site include a mine or a quarry. The mine refers to a place or a place of business where minerals are mined. The quarry refers to a place or a place of business where stones are mined. At the work site, each of the unmanned haul vehicle 10 and the unmanned water-spraying vehicle 20 operates.

In the embodiment, the work site is a mine. Examples of the mine include a metal mine for mining metal, a non-metal mine for mining limestone, and a coal mine for mining coal.

The work site is provided with a loading area 31, an unloading area 32, a parking area 33, a refueling area 34, a water supply area 35, a travel path 36, an intersection 37, and a side path 38.

The loading area 31 is an area in which a loading operation of loading a load on the unmanned haul vehicle 10 is performed. In the loading area 31, a loader 5 operates. As the loader 5, an excavator is exemplified.

The unloading area 32 refers to an area where discharging work for discharging a load from the unmanned haul vehicle 10 is performed. A crusher 6 is provided in the unloading area 32.

The parking area 33 is an area where at least one of the unmanned haul vehicle 10 and the unmanned water-spraying vehicle 20 is parked.

The refueling area 34 is an area where at least one of the unmanned haul vehicle 10 and the unmanned water-spraying vehicle 20 is supplied with fuel. An oil feeder 7 that supplies fuel is provided in the refueling area 34.

The water supply area 35 is an area where the unmanned water-spraying vehicle 20 is supplied with water. In the water supply area 35, water for water-spraying is supplied to the tank 24. The water supply area 35 is provided with a water supply device 8 that supplies water to the tank 24.

The travel path 36 refers to an area where an unmanned vehicle travels toward at least one of the loading area 31, the unloading area 32, the parking area 33, the refueling area 34, and the water supply area 35. The travel path 36 is provided so as to connect at least the loading area 31 and the unloading area 32. In the embodiment, the travel path 36 is connected to each of the loading area 31, the unloading area 32, the parking area 33, the refueling area 34, and the water supply area 35.

The intersection 37 refers to an area where a plurality of the travel paths 36 intersect or an area where one travel path 36 branches into a plurality of the travel paths 36.

The side path 38 is an area provided so as to branch from the travel path 36. In the embodiment, the side path 38 is provided in the vicinity of the travel path 36. A plurality of the side paths 38 are provided at intervals in the vicinity of the travel path 36. The unmanned water-spraying vehicle 20 traveling on the travel path 36 can enter the side path 38 from the travel path 36. The unmanned water-spraying vehicle 20 existing on the side path 38 can enter the travel path 36 from the side path 38.

[Management System]

Figure 5:
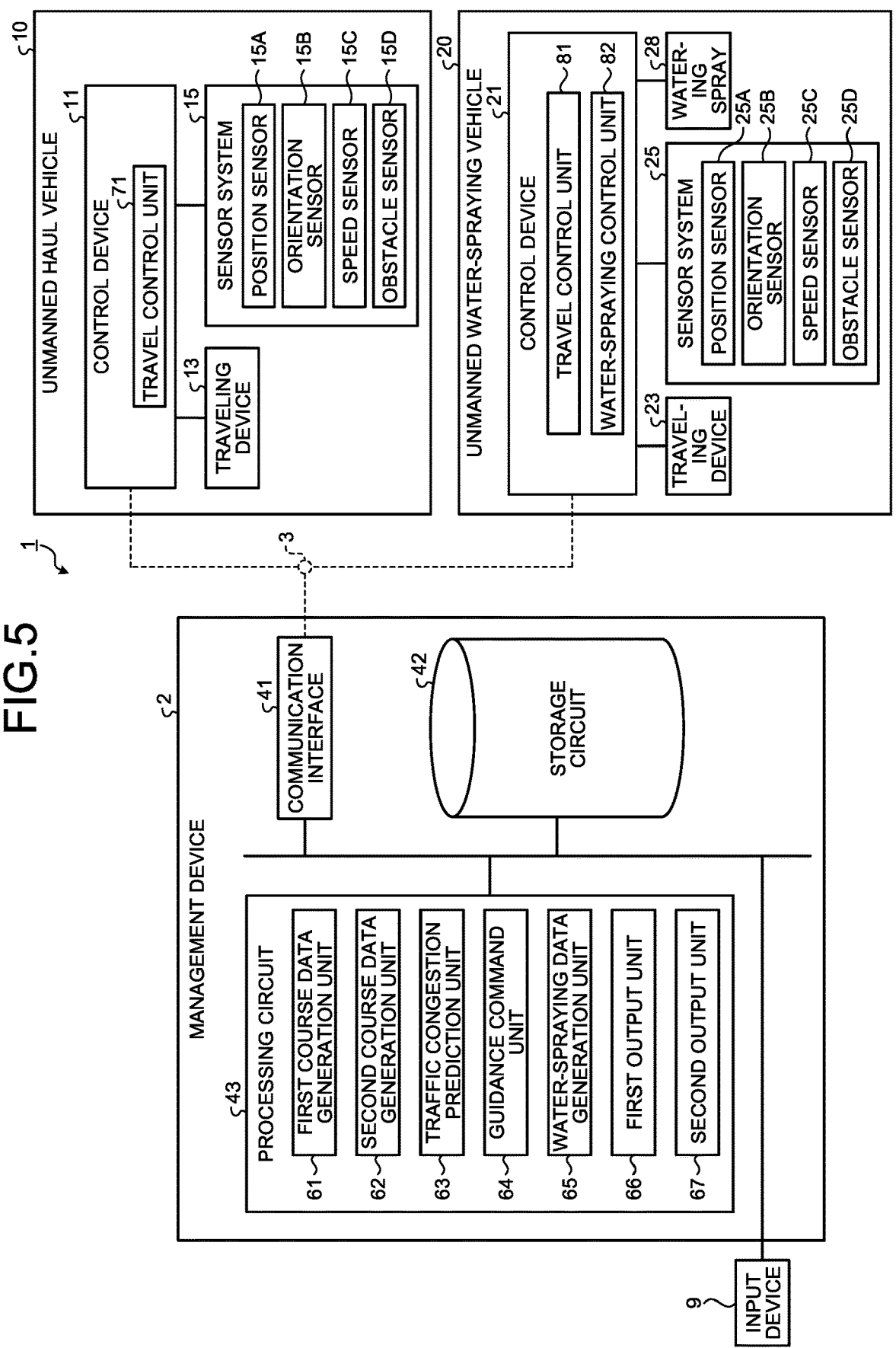
FIG. 5 is a functional block diagram illustrating a management system of a work site according to the embodiment.

FIG. 5 is a functional block diagram illustrating the management system 1 of the work site according to the embodiment. The management system 1 includes a management device 2, a communication system 3, a control device 11, and a control device 21.

The management device 2 includes a computer system. The management device 2 is connected to an input device 9. The management device 2 includes a communication interface 41, a storage circuit 42, and a processing circuit 43.

The input device 9 is connected to the processing circuit 43. The input device 9 is operated by an administrator of the control facility 4. The input device 9 generates input data on the basis of an operation of the administrator. The input data generated by the input device 9 is input to the processing circuit 43. Examples of the input device 9 include a touch panel, a computer keyboard, a mouse, and an operation button. Note that the input device 9 may be a non-contact type input device including an optical sensor, or may be a voice input device.

The communication interface 41 is connected to the processing circuit 43. The communication interface 41 controls communication between the management device 2 and at least one of the control device 11 and the control device 21. The communication interface 41 communicates with at least one of the control device 11 and the control device 21 via the communication system 3.

The storage circuit 42 is connected to the processing circuit 43. The storage circuit 42 stores data. As the storage circuit 42, a nonvolatile memory or a volatile memory is exemplified. Examples of the nonvolatile memory include a read only memory (ROM) and a storage. Examples of the storage include a hard disk drive (HDD) and a solid state drive (SSD). As the volatile memory, a random access memory (RAM) is exemplified.

The processing circuit 43 performs arithmetic processing and output processing of a control command. A processor is exemplified as the processing circuit 43. Examples of the processor include a central processing unit (CPU) and a micro processing unit (MPU). A computer program is stored in the storage circuit 42. The processing circuit 43 exerts a predetermined function by acquiring and executing a computer program from the storage circuit 42.

The processing circuit 43 includes a first course data generation unit 61, a second course data generation unit 62, a traffic congestion prediction unit 63, a guidance command unit 64, a water-spraying data generation unit 65, a first output unit 66, and a second output unit 67.

The first course data generation unit 61 generates first course data indicating a travel condition of the unmanned haul vehicle 10 set at the work site. The first course data generation unit 61 may generate the first course data on the basis of the input data from the input device 9.

Figure 6:
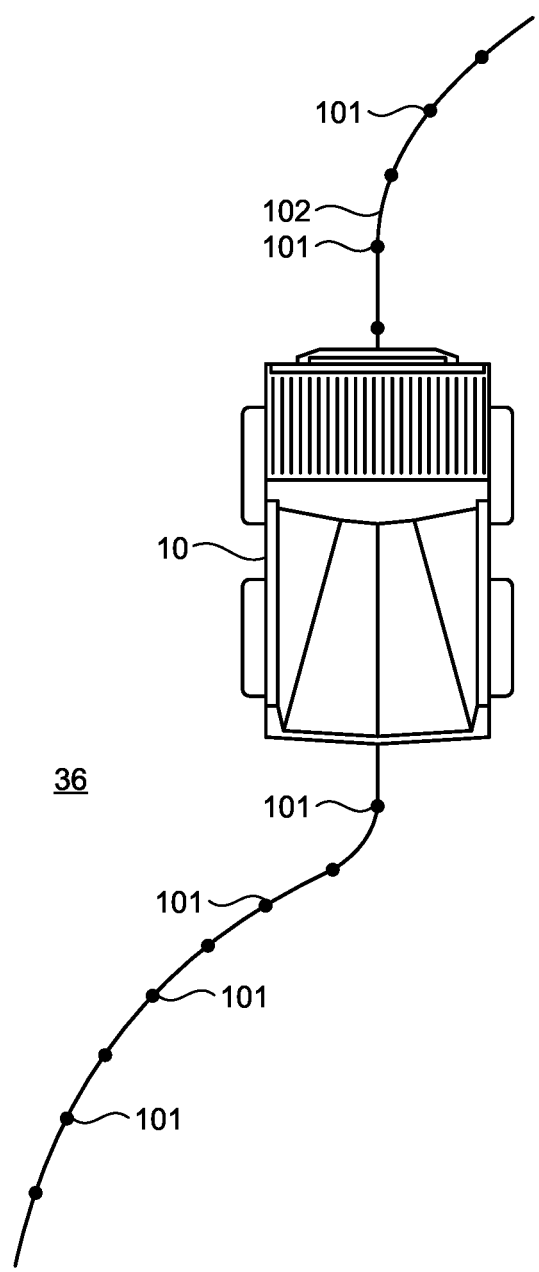
FIG. 6 is a diagram for explaining first course data according to the embodiment.

FIG. 6 is a diagram for explaining the first course data according to the embodiment. The first course data defines a travel condition of the unmanned haul vehicle 10. The first course data includes a course point 101, a travel course 102, a target position of the unmanned haul vehicle 10, a target orientation of the unmanned haul vehicle 10, and a target traveling speed of the unmanned haul vehicle 10.

A plurality of the course points 101 are set on the travel path 36 including the intersection 37. Furthermore, the plurality of course points 101 are set in each of the loading area 31, the unloading area 32, the parking area 33, and the refueling area 34. Each of the course points 101 defines a target position of the unmanned haul vehicle 10. A target orientation and a target traveling speed of the unmanned haul vehicle 10 are set for each of the plurality of course points 101. The plurality of course points 101 are set at intervals. The interval between the course points 101 is set to, for example, 1 [m] or more and 5 [m] or less. The intervals between the course points 101 may be uniform or non-uniform.

The travel course 102 refers to a virtual line indicating a target travel route of the unmanned haul vehicle 10. The travel course 102 is defined by a trajectory passing through the plurality of course points 101. The unmanned haul vehicle 10 travels through the work site along the travel course 102.

The target position of the unmanned haul vehicle 10 refers to a target position of the unmanned haul vehicle 10 when passing through the course point 101. The target position of the unmanned haul vehicle 10 may be defined in the local coordinate system of the unmanned haul vehicle 10 or may be defined in the global coordinate system.

The target orientation of the unmanned haul vehicle 10 refers to a target orientation of the unmanned haul vehicle 10 when passing through the course point 101.

The target traveling speed of the unmanned haul vehicle 10 refers to a target traveling speed of the unmanned haul vehicle 10 when passing through the course point 101. The target traveling speed of the unmanned haul vehicle 10 includes an upper limit speed (limit speed) indicating an upper limit value of the traveling speed of the unmanned haul vehicle 10. The unmanned haul vehicle 10 travels at a traveling speed not exceeding the upper limit speed at the work site.

The second course data generation unit 62 generates second course data indicating a travel condition of the unmanned water-spraying vehicle 20 set at the work site. The second course data generation unit 62 may generate the second course data on the basis of the input data from the input device 9.

Figure 7:
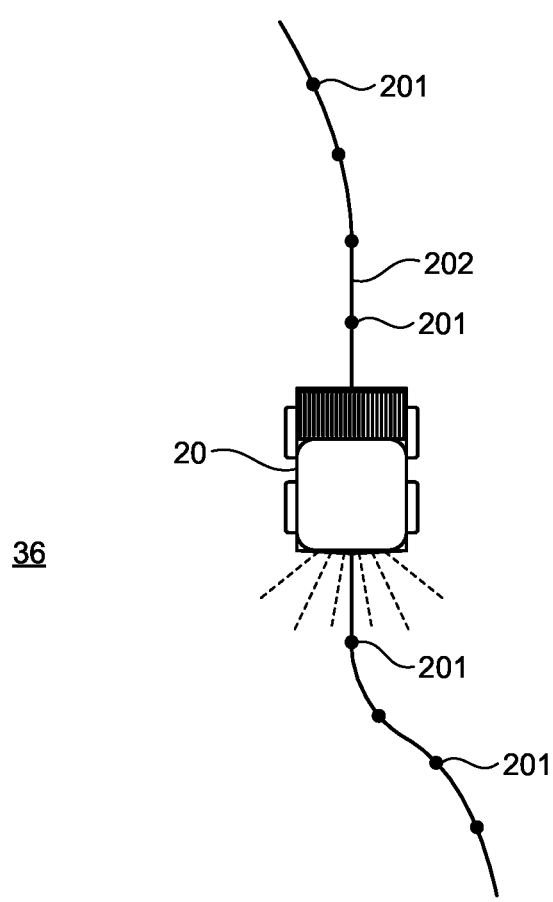
FIG. 7 is a diagram for explaining second course data according to the embodiment.

FIG. 7 is a diagram for explaining the second course data according to the embodiment. The second course data defines a travel condition of the unmanned water-spraying vehicle 20. The second course data includes a course point 201, a travel course 202, a target position of the unmanned water-spraying vehicle 20, a target orientation of the unmanned water-spraying vehicle 20, and a target traveling speed of the unmanned water-spraying vehicle 20. A plurality of the course points 201 are set on the travel path 36. Furthermore, the plurality of course points 201 are set in each of the loading area 31, the unloading area 32, the parking area 33, the refueling area 34, the water supply area 35, and the side path 38. The travel course 202 of the unmanned water-spraying vehicle 20 refers to a virtual line indicating a target travel route of the unmanned water-spraying vehicle 20. The target traveling speed of the unmanned water-spraying vehicle 20 refers to a target traveling speed of the unmanned water-spraying vehicle 20 when passing through the course point 201. The target traveling speed of the unmanned water-spraying vehicle 20 includes an upper limit speed (speed limit) indicating an upper limit value of the traveling speed of the unmanned water-spraying vehicle 20. The unmanned water-spraying vehicle 20 travels at a traveling speed not exceeding the upper limit speed at the work site. A function of the first course data and a function of the second course data are similar. Description of the second course data will be omitted.

Note that the target traveling speed (upper limit speed) of the unmanned haul vehicle 10 and the target traveling speed (upper limit speed) of the unmanned water-spraying vehicle 20 are different. The target traveling speed (upper limit speed) of the unmanned water-spraying vehicle 20 is lower than the target traveling speed of the unmanned haul vehicle 10.

The traffic congestion prediction unit 63 predicts occurrence of a traffic congestion on the travel path 36 from travel situations of a plurality of the unmanned vehicles traveling on the travel path 36 at the work site.

For example, the traffic congestion prediction unit 63 predicts that a traffic congestion will occur due to the unmanned water-spraying vehicle 20 when it is predicted that a distance between the unmanned haul vehicle 10 and the unmanned water-spraying vehicle 20 will be less than or equal to a predetermined distance threshold after a predetermined time based on a travel situation of each of the unmanned haul vehicle 10 traveling on the travel path 36 and the unmanned water-spraying vehicle 20 traveling ahead of the unmanned haul vehicle 10.

When a predetermined first condition is satisfied, the guidance command unit 64 outputs a first guidance command so that the unmanned water-spraying vehicle 20 traveling on the travel path 36 enters the side path 38 from the travel path 36. For example, when occurrence of a traffic congestion is predicted by the traffic congestion prediction unit 63, the guidance command unit 64 outputs a first guidance command so that an unmanned vehicle that causes the traffic congestion enters the side path 38 branching from the travel path 36. When occurrence of a traffic congestion caused by the unmanned water-spraying vehicle 20 is predicted, the guidance command unit 64 outputs a first guidance command so that the unmanned water-spraying vehicle 20 causing the traffic congestion enters the side path 38 from the travel path 36. When a predetermined second condition is satisfied, the guidance command unit 64 outputs a second guidance command so that the unmanned water-spraying vehicle 20 existing on the side path 38 enters the travel path 36 from the side path 38.

The water-spraying data generation unit 65 generates water-spraying data for controlling the watering spray 28. The water-spraying data includes at least one of execution and stop of water-spraying from the watering spray 28, a water-spraying position where the watering spray 28 sprays water at the work site, and a water-spraying amount per unit time from the watering spray 28. The water-spraying position where the watering spray 28 sprays water includes a water-spraying area where the watering spray 28 sprays water. Furthermore, in a case where a plurality of the watering sprays 28 is provided in the unmanned water-spraying vehicle 20, the water-spraying data includes the number of the watering sprays 28 that execute water spraying. Furthermore, in a case where the watering spray 28 is installed at each of a plurality of positions of the unmanned water-spraying vehicle 20, the water-spraying data includes an installation position of the watering spray 28 that executes water spraying. The water-spraying data generation unit 65 may generate the water-spraying data based on the input data from the input device 9.

The first output unit 66 outputs the first course data generated by the first course data generation unit 61 to the unmanned haul vehicle 10. The first output unit 66 transmits the first course data from the communication interface 41 to the control device 11 of the unmanned haul vehicle 10.

The second output unit 67 outputs the second course data generated by the second course data generation unit 62 to the unmanned water-spraying vehicle 20. The second output unit 67 transmits the second course data from the communication interface 41 to the control device 21 of the unmanned water-spraying vehicle 20.

The second output unit 67 outputs at least one of the first guidance command and the second guidance command output from the guidance command unit 64 to the unmanned water-spraying vehicle 20. The second output unit 67 transmits at least one of the first guidance command and the second guidance command from the communication interface 41 to the control device 21 of the unmanned water-spraying vehicle 20.

The second output unit 67 outputs the water-spraying data generated by the water-spraying data generation unit 65 to the unmanned water-spraying vehicle 20. The second output unit 67 transmits the water-spraying data from the communication interface 41 to the control device 21 of the unmanned water-spraying vehicle 20.

The control device 11 includes a computer system. Similarly to the management device 2, the control device 11 includes a communication interface, a storage circuit, and a processing circuit. The control device 11 includes a travel control unit 71 that controls the traveling device 13. The travel control unit 71 controls the traveling device 13 based on the first course data transmitted from the management device 2.

The control device 21 includes a computer system. Similarly to the management device 2, the control device 21 includes a communication interface, a storage circuit, and a processing circuit. The control device 21 includes a travel control unit 81 that controls the traveling device 23 and a water-spraying control unit 82 that controls the watering spray 28. The travel control unit 81 controls the traveling device 23 based on the second course data transmitted from the management device 2. The travel control unit 81 controls the traveling device 23 based on at least one of the first guidance command and the second guidance command transmitted from the management device 2. The water-spraying control unit 82 controls the watering spray 28 based on the water-spraying data transmitted from the management device 2.

The travel control unit 71 controls the traveling device 13 based on the first course data and detected data of the sensor system 15. The travel control unit 71 controls the traveling device 13 such that the unmanned haul vehicle 10 travels along the travel course 102 based on the detected data of the position sensor 15A and the detected data of the orientation sensor 15B.

That is, the travel control unit 71 controls the traveling device 13 so that a deviation between a detected position of the unmanned haul vehicle 10 detected by the position sensor 15A when passing through the course point 101 and a target position of the unmanned haul vehicle 10 set at the course point 101 becomes small.

Furthermore, the travel control unit 71 controls the traveling device 13 so that a deviation between a detected orientation of the unmanned haul vehicle 10 detected by the orientation sensor 15B when passing through the course point 101 and a target orientation of the unmanned haul vehicle 10 set at the course point 101 becomes small.

Furthermore, the travel control unit 71 controls the traveling device 13 so that the unmanned haul vehicle 10 travels at a target traveling speed based on detected data of the speed sensor 15C. That is, the travel control unit 71 controls the traveling device 13 so that a deviation between a detected traveling speed of the unmanned haul vehicle 10 detected by the speed sensor 15C when passing through the course point 101 and a target traveling speed of the unmanned haul vehicle 10 set at the course point 101 becomes small.

As described above, the target traveling speed of the unmanned haul vehicle 10 includes the upper limit speed of the unmanned haul vehicle 10. The travel control unit 71 controls the traveling device 13 so that the unmanned haul vehicle 10 travels at a traveling speed not exceeding the upper limit speed based on the detected data of the speed sensor 15C. That is, the travel control unit 71 controls the traveling device 13 so that the detected traveling speed of the unmanned haul vehicle 10 detected by the speed sensor 15C when passing through the course point 101 does not exceed the upper limit speed of the unmanned haul vehicle 10 set at the course point 101.

The travel control unit 81 controls the traveling device 23 based on the second course data and detected data of the sensor system 25. The travel control unit 81 controls the traveling device 23 so that the unmanned water-spraying vehicle 20 travels along the travel course 202 based on detected data of the position sensor 25A and detected data of the orientation sensor 25B.

That is, the travel control unit 81 controls the traveling device 23 so as to reduce a deviation between a detected position of the unmanned water-spraying vehicle 20 detected by the position sensor 25A when passing through the course point 201 and a target position of the unmanned water-spraying vehicle 20 set at the course point 201.

Furthermore, the travel control unit 81 controls the traveling device 23 so as to reduce a deviation between a detected orientation of the unmanned water-spraying vehicle 20 detected by the orientation sensor 25B when passing through the course point 201 and a target orientation of the unmanned water-spraying vehicle 20 set at the course point 201.

Furthermore, the travel control unit 81 controls the traveling device 23 based on detected data of the speed sensor 25C so that the unmanned water-spraying vehicle 20 travels at a target traveling speed. That is, the travel control unit 81 controls the traveling device 23 so as to reduce a deviation between a detected traveling speed of the unmanned water-spraying vehicle 20 detected by the speed sensor 25C when passing through the course point 101 and a target traveling speed of the unmanned water-spraying vehicle 20 set at the course point 201.

As described above, the target traveling speed of the unmanned water-spraying vehicle 20 includes the upper limit speed of the unmanned water-spraying vehicle 20. The travel control unit 81 controls the traveling device 23 based on the detected data of the speed sensor 25C so that the unmanned water-spraying vehicle 20 travels at a traveling speed not exceeding the upper limit speed. That is, the travel control unit 81 controls the traveling device 23 so that the detected traveling speed of the unmanned water-spraying vehicle 20 detected by the speed sensor 25C when passing through the course point 201 does not exceed the upper limit speed of the unmanned water-spraying vehicle 20 set at the course point 201.

[Processing of Guidance Command Unit]

Figure 8:
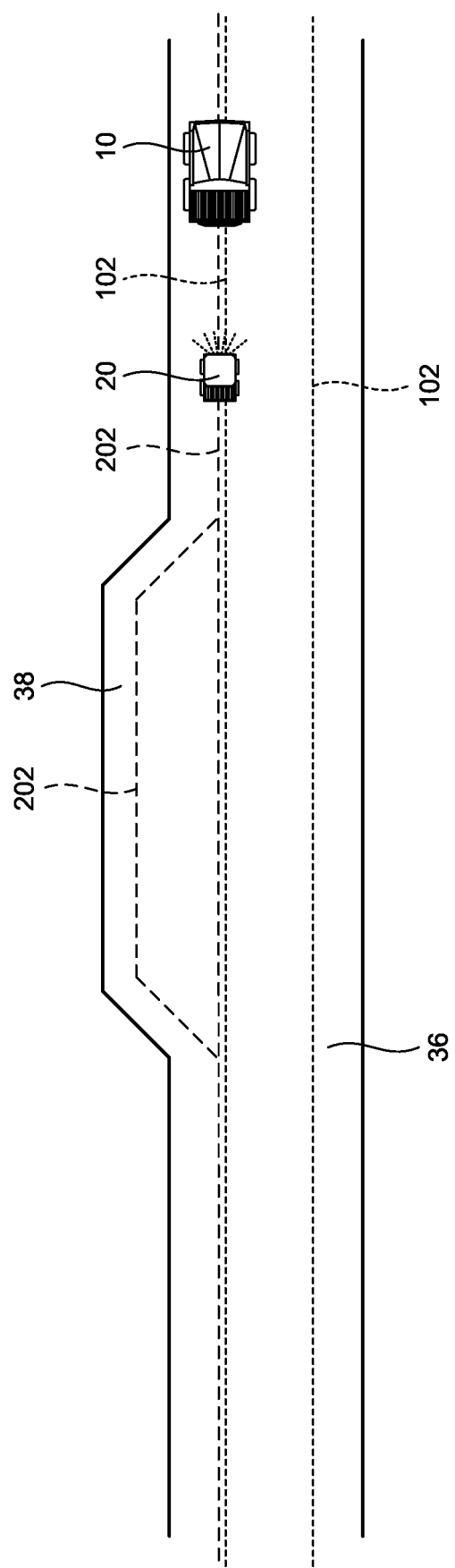
FIG. 8 is a diagram for explaining processing of a guidance command unit according to the embodiment.
Figure 9:
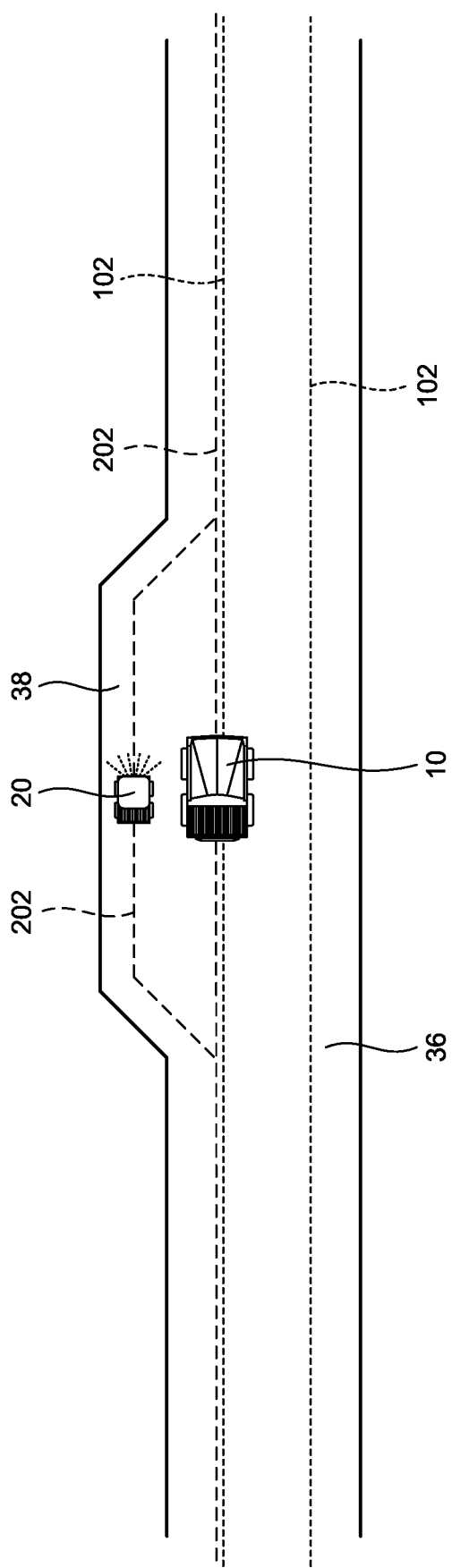
FIG. 9 is a diagram for explaining processing of the guidance command unit according to the embodiment.
Figure 10:
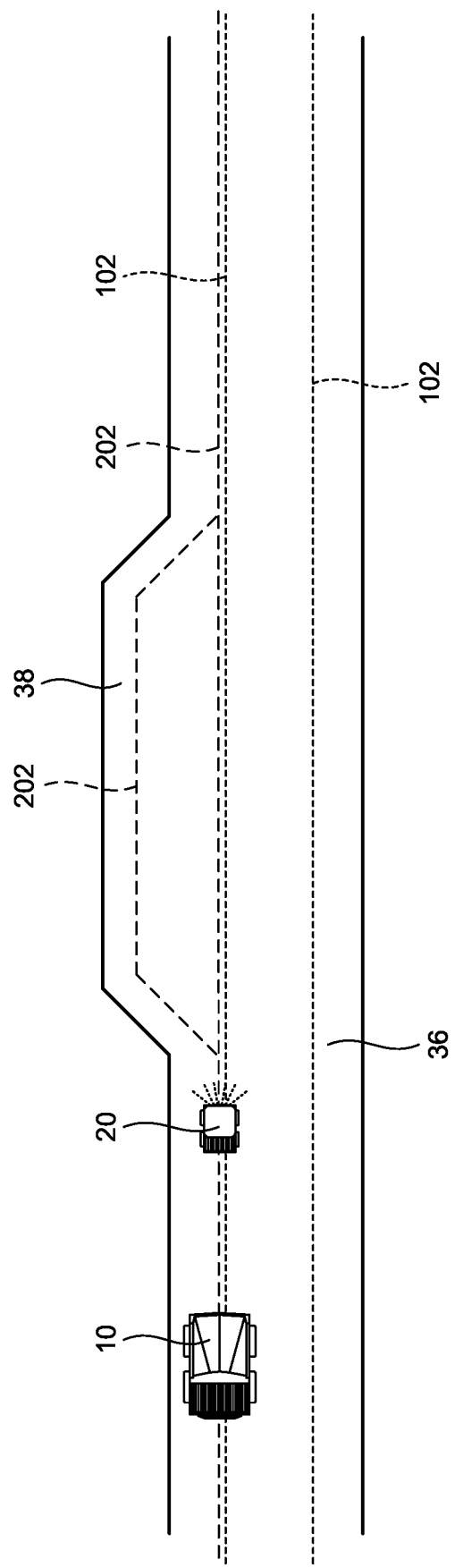
FIG. 10 is a diagram for explaining processing of the guidance command unit according to the embodiment.

Each of FIGS. 8, 9, and 10 is a diagram for explaining processing of the guidance command unit 64 according to the embodiment.

The unmanned haul vehicle 10 travels on the travel path 36 at the work site at a first traveling speed V1. The first traveling speed V1 is an actual traveling speed of the unmanned haul vehicle 10. The first course data generation unit 61 generates first course data so that the unmanned haul vehicle 10 travels on the travel path 36 at the target traveling speed. The unmanned haul vehicle 10 travels on the travel path 36 at the first traveling speed V1 based on the first course data transmitted from the first course data generation unit 61.

The unmanned water-spraying vehicle 20 travels on the travel path 36 at the work site at a second traveling speed V2. The second traveling speed V2 is an actual traveling speed of the unmanned water-spraying vehicle 20. The second course data generation unit 62 generates second course data so that the unmanned water-spraying vehicle 20 travels on the travel path 36 at the target traveling speed. The unmanned water-spraying vehicle 20 travels on the travel path 36 at the second traveling speed V2 based on the second course data transmitted from the second course data generation unit 62.

Furthermore, the unmanned water-spraying vehicle 20 travels on the travel path 36 at the second traveling speed V2 while spraying water on the travel path 36 at the work site. The water-spraying data generation unit 65 generates water-spraying data so that the unmanned water-spraying vehicle 20 travels while spraying water on the travel path 36. The unmanned water-spraying vehicle 20 travels on the travel path 36 at the second traveling speed V2 while spraying water on the travel path 36 based on the water-spraying data transmitted from the water-spraying data generation unit 65. Note that the unmanned water-spraying vehicle 20 may travel on the travel path 36 at the second traveling speed V2 without spraying water.

Note that the first traveling speed V1, which is the actual traveling speed of the unmanned haul vehicle 10, and the target traveling speed of the unmanned haul vehicle 10 may not necessarily coincide with each other. For example, when the unmanned haul vehicle 10 travels on an uphill, the actual traveling speed of the unmanned haul vehicle 10 may be lower than the target traveling speed. Similarly, the second traveling speed V2, which is the actual traveling speed of the unmanned water-spraying vehicle 20, and the target traveling speed of the unmanned water-spraying vehicle 20 may not necessarily coincide with each other.

When a predetermined first condition is satisfied, the guidance command unit 64 outputs a first guidance command so that the unmanned water-spraying vehicle 20 traveling on the travel path 36 enters the side path 38 from the travel path 36.

FIG. 8 illustrates a state where the first condition is satisfied. The first condition includes a case where occurrence of a traffic congestion is predicted from the travel situations of the unmanned haul vehicle 10 and the unmanned water-spraying vehicle 20 traveling on the travel path 36 at the work site.

Traveling of the unmanned water-spraying vehicle 20 in front of the unmanned haul vehicle 10 includes setting the travel course 102 of the unmanned haul vehicle 10 and the travel course 202 of the unmanned water-spraying vehicle 20 on the same travel path 36. Furthermore, the case where the unmanned water-spraying vehicle 20 travels in front of the unmanned haul vehicle 10 includes a case where the travel course 102 and the travel course 202 are set to be parallel to each other or the travel course 102 and the travel course 202 are set to overlap each other on the same travel path 36.

The case where occurrence of a traffic congestion is predicted includes a case where it is predicted that a distance between the unmanned haul vehicle 10 and the unmanned water-spraying vehicle 20 will be less than or equal to a predetermined distance threshold after a predetermined time based on a travel situation of each of the unmanned haul vehicle 10 traveling on the travel path 36 and the unmanned water-spraying vehicle 20 traveling in front of the unmanned haul vehicle 10.

The guidance command unit 64 outputs a first guidance command to the unmanned water-spraying vehicle 20 so that the unmanned water-spraying vehicle 20 enters the side path 38 branching from the travel path 36 when occurrence of a traffic congestion is predicted from a travel situation of the unmanned haul vehicle 10 traveling on the travel path 36 at the work site at the first traveling speed V1 and a travel situation of the unmanned water-spraying vehicle 20 traveling ahead of the unmanned haul vehicle 10 at the second traveling speed V2 lower than the first traveling speed V1.

FIG. 9 illustrates a state where the unmanned water-spraying vehicle 20 has entered the side path 38. The second course data generation unit 62 generates second course data so that the second course data (travel course 202) of the unmanned water-spraying vehicle 20 is set on the side path 38. The travel course 202 of the unmanned water-spraying vehicle 20 is set on each of the travel path 36 and the side path 38.

The second course data generation unit 62 generates second course data such that the unmanned water-spraying vehicle 20 travels on the side path 38 at a traveling speed lower than the first traveling speed V1. On the basis of the second course data transmitted from the second course data generation unit 62, the unmanned water-spraying vehicle 20 travels on the side path 38 at the second traveling speed V2 or a traveling speed lower than the first traveling speed V1.

Note that the second course data generation unit 62 may generate the second course data such that the unmanned water-spraying vehicle 20 stops on the side path 38. The unmanned water-spraying vehicle 20 may stop on the side path 38 based on the second course data transmitted from the second course data generation unit 62.

In a case where the unmanned water-spraying vehicle 20 travels on the side path 38 at the second traveling speed V2 or a traveling speed lower than the first traveling speed V1, the side path 38 functions as a low-speed traveling lane. In a case where the unmanned water-spraying vehicle 20 stops on the side path 38, the side path 38 functions as a turnout.

The unmanned haul vehicle 10 travels on the travel path 36 at the first traveling speed V1 based on the first course data. The first course data is not set on the side path 38. The unmanned haul vehicle 10 travels on the travel path 36 at the first traveling speed V1 without entering the side path 38.

Since the unmanned haul vehicle 10 travels on the travel path 36 at a high speed in a state where the unmanned water-spraying vehicle 20 travels at a low speed or stops on the side path 38, the unmanned haul vehicle 10 can overtake the unmanned water-spraying vehicle 20.

When a predetermined second condition is satisfied, the guidance command unit 64 outputs a second guidance command so that the unmanned water-spraying vehicle 20 existing on the side path 38 enters the travel path 36 from the side path 38.

FIG. 10 illustrates a state where the second condition is satisfied. The second condition includes that the unmanned haul vehicle 10 has overtaken the unmanned water-spraying vehicle 20 existing on the side path 38.

The situation in which the unmanned haul vehicle 10 has overtaken the unmanned water-spraying vehicle 20 includes that, when the unmanned haul vehicle 10 travels along the travel course 102 set on the travel path 36 and travels along the travel course 202 set on the travel path 36 after the unmanned water-spraying vehicle 20 enters the travel path 36 from the side path 38, the unmanned haul vehicle 10 travels at the first traveling speed V1 in front of the unmanned water-spraying vehicle 20 traveling at the second traveling speed V2.

The guidance command unit 64 can determine whether or not the unmanned haul vehicle 10 has overtaken the unmanned water-spraying vehicle 20 based on the detected data of the position sensor 15A of the unmanned haul vehicle 10 and the detected data of the position sensor 25A of the unmanned water-spraying vehicle 20. That is, the guidance command unit 64 determines whether or not the unmanned haul vehicle 10 has overtaken the unmanned water-spraying vehicle 20 based on a relative position between the unmanned haul vehicle 10 and the unmanned water-spraying vehicle 20 at the work site.

Traveling of the unmanned haul vehicle 10 in front of the unmanned water-spraying vehicle 20 includes setting the travel course 102 of the unmanned haul vehicle 10 and the travel course 202 of the unmanned water-spraying vehicle 20 on the same travel path 36. Furthermore, the case where the unmanned haul vehicle 10 travels in front of the unmanned water-spraying vehicle 20 includes a case where the travel course 102 and the travel course 202 are set in parallel, or a case where the travel course 102 and the travel course 202 overlap each other on the same travel path 36.

The guidance command unit 64 outputs a second guidance command so that the unmanned water-spraying vehicle 20 enters the travel path 36 from the side path 38 after the unmanned haul vehicle 10 has overtaken the unmanned water-spraying vehicle 20 existing on the side path 38. The second course data generation unit 62 generates second course data for allowing the unmanned water-spraying vehicle 20 to enter the travel path 36 from the side path 38.

The unmanned water-spraying vehicle 20 receives each of the second course data and the second guidance command from the management device 2. After receiving the second guidance command, the unmanned water-spraying vehicle 20 enters the travel path 36 from the side path 38 based on the second course data.

Since the unmanned haul vehicle 10 traveling at a high speed can overtake the unmanned water-spraying vehicle 20 traveling at a low speed, occurrence of a traffic congestion on the travel path 36 at the work site is suppressed.

[Unmanned Vehicle Management Method]

Figure 11:
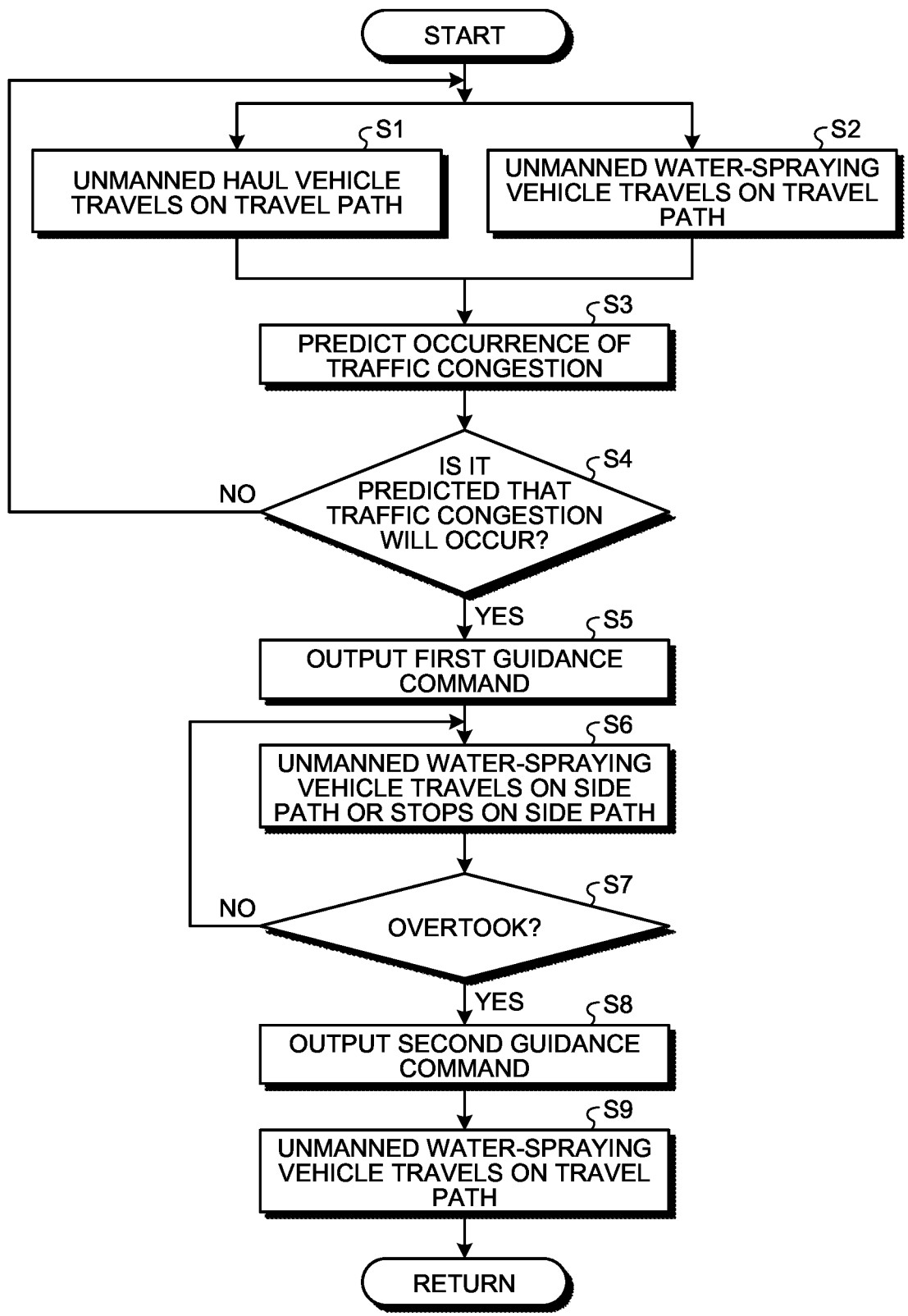
FIG. 11 is a flowchart illustrating a management method of an unmanned vehicle according to the embodiment.

FIG. 11 is a flowchart illustrating an unmanned vehicle management method according to the embodiment.

The first course data generation unit 61 generates first course data of the unmanned haul vehicle 10. The first output unit 66 transmits the first course data generated by the first course data generation unit 61 to the unmanned haul vehicle 10. The unmanned haul vehicle 10 travels on the travel path 36 at the first traveling speed V1 based on the first course data (step S1).

The second course data generation unit 62 generates second course data of the unmanned water-spraying vehicle 20. The second output unit 67 transmits the second course data generated by the second course data generation unit 62 to the unmanned water-spraying vehicle 20. Furthermore, in a case where the water-spraying data is generated by the water-spraying data generation unit 65, the second output unit 67 transmits the water-spraying data to the unmanned water-spraying vehicle 20. The unmanned water-spraying vehicle 20 travels on the travel path 36 at the second traveling speed V2 based on the second course data. Furthermore, when receiving the water-spraying data, the unmanned water-spraying vehicle 20 sprays water on the travel path 36 while traveling on the travel path 36 based on the water-spraying data (step S2).

The traffic congestion prediction unit 63 predicts occurrence of a traffic congestion from a travel situation of each of the unmanned haul vehicle 10 traveling on the travel path 36 at the work site and the unmanned water-spraying vehicle 20 traveling in front of the unmanned haul vehicle 10 (step S3).

For example, when it is predicted that a distance between the unmanned haul vehicle 10 and the unmanned water-spraying vehicle 20 will be less than or equal to a predetermined distance threshold after a predetermined time based on a travel situation of each of the unmanned haul vehicle 10 traveling on the travel path 36 at the work site and the unmanned water-spraying vehicle 20 traveling ahead of the unmanned haul vehicle 10, the traffic congestion prediction unit 63 predicts that a traffic congestion will occur due to the unmanned water-spraying vehicle 20.

The guidance command unit 64 determines whether or not the first condition is satisfied. That is, the guidance command unit 64 determines whether or not the unmanned water-spraying vehicle 20 travels in front of the unmanned haul vehicle 10 on the travel path 36, and a distance after a predetermined time between the unmanned haul vehicle 10 and the unmanned water-spraying vehicle 20 on the travel path 36 is less than or equal to a predetermined distance threshold, and determines whether or not it is predicted that a traffic congestion will occur (step S4).

In a case where it is determined in step S4 that the first condition is not satisfied (step S4: No), the process returns to steps S1 and S2.

In a case where it is determined in step S4 that the first condition is satisfied (step S4: Yes), the guidance command unit 64 outputs a first guidance command to the unmanned water-spraying vehicle 20 so that the unmanned water-spraying vehicle 20 enters the side path 38 from the travel path 36 (step S5).

The unmanned water-spraying vehicle 20 enters the side path 38 from the travel path 36 based on the first guidance command. The unmanned water-spraying vehicle 20 travels on the side path 38 at the second traveling speed V2 or a traveling speed lower than the first traveling speed lower than the second traveling speed V2. Note that the unmanned water-spraying vehicle 20 may stop on the side path 38 (step S6).

The unmanned haul vehicle 10 travels on the travel path 36 at the first traveling speed V1 without entering the side path 38.

The guidance command unit 64 determines whether or not the second condition is satisfied. That is, the guidance command unit 64 determines whether or not the unmanned haul vehicle 10 has overtaken the unmanned water-spraying vehicle 20 existing on the side path 38 (step S7).

In a case where it is determined in step S7 that the second condition is not satisfied (step S7: No), the process returns to step S6.

In a case where it is determined in step S7 that the second condition is satisfied (step S7: Yes), the guidance command unit 64 outputs a second guidance command to the unmanned water-spraying vehicle 20 so that the unmanned water-spraying vehicle 20 enters the travel path 36 from the side path 38 (step S8).

The unmanned water-spraying vehicle 20 enters the travel path 36 from the side path 38 based on the second guidance command. On the travel path 36, the unmanned water-spraying vehicle 20 travels behind the unmanned haul vehicle 10 (step S9).

Advantageous Effects

As described above, according to the embodiment, the occurrence of a traffic congestion is predicted from the travel situations of the plurality of unmanned vehicles traveling on the travel path 36 at the work site. In a case where it is predicted that the cause of the traffic congestion is the unmanned water-spraying vehicle 20, the first guidance command is output so that the unmanned water-spraying vehicle 20 that causes the traffic congestion enters the side path 38 branching from the travel path 36. As a result, the unmanned haul vehicle 10 can overtake the unmanned water-spraying vehicle 20 by continuing traveling on the travel path 36. Therefore, the occurrence of a traffic congestion on the travel path 36 at the work site is suppressed.

When it is predicted that the unmanned haul vehicle 10 traveling on the travel path 36 at the first traveling speed V1 at the work site approaches the unmanned water-spraying vehicle 20 traveling in front of the unmanned haul vehicle 10, a first guidance command is output to the unmanned water-spraying vehicle 20 so that the unmanned water-spraying vehicle 20 enters the side path 38 branching from the travel path 36. As a result, the unmanned haul vehicle 10 can overtake the unmanned water-spraying vehicle 20 by continuing traveling on the travel path 36. Therefore, the occurrence of a traffic congestion on the travel path 36 at the work site is suppressed.

The first condition under which the first guidance command is output includes that a distance after a predetermined time between the unmanned haul vehicle 10 and the unmanned water-spraying vehicle 20 on the travel path 36 has become less than or equal to a predetermined distance threshold. As a result, the first guidance command is output when the first condition is appropriately determined and the unmanned water-spraying vehicle 20 needs to overtake the unmanned haul vehicle 10.

The second condition for outputting the second guidance command includes that the unmanned haul vehicle 10 traveling on the travel path 36 has overtaken the unmanned water-spraying vehicle 20 existing on the side path 38. As a result, the second condition is appropriately determined, and the unmanned water-spraying vehicle 20 can travel behind the unmanned haul vehicle 10 on the travel path 36.

Other Embodiments

In the above-described embodiment, the first course data may not be generated. The unmanned haul vehicle 10 may travel on the travel path 36 at the first traveling speed V1 not based on the first course data. In the above-described embodiment, the second course data may not be generated. The unmanned water-spraying vehicle 20 may travel on the travel path 36 at the second traveling speed V2 not based on the second course data. The unmanned water-spraying vehicle 20 may travel on the side path 38 at the second traveling speed V2 or a traveling speed lower than the first traveling speed V1, or may decelerate or stop on the side path 38 not based on the second course data.

In the above-described embodiment, at least a part of the function of the control device 11 and the function of the control device 21 may be provided in the management device 2, or at least a part of the function of the management device 2 may be provided in one or both of the control device 11 and the control device 21. For example, in the above-described embodiment, the control device 11 may have the function of the first course data generation unit 61 and the function of the traffic congestion prediction unit 63. The control device 21 may have the function of the second course data generation unit 62, the function of the traffic congestion prediction unit 63, the function of the guidance command unit 64, and the function of the water-spraying data generation unit 65.

In the above-described embodiment, each of the first course data generation unit 61, the second course data generation unit 62, the traffic congestion prediction unit 63, the guidance command unit 64, the water-spraying data generation unit 65, the first output unit 66, and the second output unit 67 may be configured by different hardware.

In the above-described embodiment, the first unmanned vehicle 10 is an unmanned haul vehicle, and the second unmanned vehicle 20 is an unmanned water-spraying vehicle. Both the first unmanned vehicle 10 and the second unmanned vehicle 20 may be unmanned haul vehicles. The first unmanned vehicle 10 may be an unmanned haul vehicle that travels on the travel path 36 at the first traveling speed V1, and the second unmanned vehicle 20 may be an unmanned haul vehicle that travels on the travel path 36 at the second traveling speed V2. Furthermore, both the first unmanned vehicle 10 and the second unmanned vehicle 20 may be unmanned water-spraying vehicles. The first unmanned vehicle 10 may be an unmanned water-spraying vehicle that travels on the travel path 36 at the first traveling speed V1, and the second unmanned vehicle 20 may be an unmanned water-spraying vehicle that travels on the travel path 36 at the second traveling speed V2.

REFERENCE SIGNS LIST

1 MANAGEMENT SYSTEM
2 MANAGEMENT DEVICE
3 COMMUNICATION SYSTEM
3A WIRELESS COMMUNICATION DEVICE
3B WIRELESS COMMUNICATION DEVICE
3C WIRELESS COMMUNICATION DEVICE
4 CONTROL FACILITY
5 LOADER
6 CRUSHER
7 OIL FEEDER
8 WATER SUPPLY DEVICE
9 INPUT DEVICE
10 UNMANNED HAUL VEHICLE (FIRST UNMANNED VEHICLE)
11 CONTROL DEVICE
12 VEHICLE BODY
13 TRAVELING DEVICE
14 DUMP BODY
15 SENSOR SYSTEM
15A POSITION SENSOR
15B ORIENTATION SENSOR
15C SPEED SENSOR
15D OBSTACLE SENSOR
16 WHEEL
16F FRONT WHEEL
16R REAR WHEEL
17 TIRE
17F FRONT TIRE
17R REAR TIRE
20 UNMANNED WATER-SPRAYING VEHICLE (SECOND UNMANNED VEHICLE)
21 CONTROL DEVICE
22 VEHICLE BODY
23 TRAVELING DEVICE
24 TANK
25 SENSOR SYSTEM
25A POSITION SENSOR
25B ORIENTATION SENSOR
25C SPEED SENSOR
25D OBSTACLE SENSOR
26 WHEEL
26F FRONT WHEEL
26R REAR WHEEL
27 TIRE
27F FRONT TIRE
27R REAR TIRE
28 WATERING SPRAY
29 CAB
31 LOADING AREA
32 UNLOADING AREA
33 PARKING AREA
34 REFUELING AREA
35 WATER SUPPLY AREA
36 TRAVEL PATH
37 INTERSECTION
38 SIDE PATH
41 COMMUNICATION INTERFACE
42 STORAGE CIRCUIT

43 PROCESSING CIRCUIT
61 FIRST COURSE DATA GENERATION UNIT
62 SECOND COURSE DATA GENERATION UNIT
63 TRAFFIC CONGESTION PREDICTION UNIT
64 GUIDANCE COMMAND UNIT
65 WATER-SPRAYING DATA GENERATION UNIT
66 FIRST OUTPUT UNIT
67 SECOND OUTPUT UNIT
71 TRAVEL CONTROL UNIT
81 TRAVEL CONTROL UNIT
82 WATER-SPRAYING CONTROL UNIT
101 COURSE POINT
102 TRAVEL COURSE
201 COURSE POINT
202 TRAVEL COURSE

The invention claimed is:

1. An unmanned vehicle management system comprising:
a traffic congestion prediction unit that predicts occurrence of a traffic congestion from travel situations of a plurality of unmanned vehicles traveling on a travel path at a work site, the plurality of unmanned vehicles including a first unmanned vehicle and a second unmanned vehicle; and
a guidance command unit that, when occurrence of a traffic congestion is predicted, outputs a first guidance command such that the second unmanned vehicle that causes the traffic congestion enters a side path branching from the travel path;
wherein a first course data generation unit generates first course data indicating a travel condition of the first unmanned vehicle, wherein a second course data generation unit generates second course data indicating a travel condition of the second unmanned vehicle, and wherein the second course data includes a travel course indicating a target travel route of the second unmanned vehicle, and the travel course is set on each of the travel path and the side path.

2. The unmanned vehicle management system according to claim 1, wherein
based on a travel situation of each of the first unmanned vehicle traveling on the travel path and the second unmanned vehicle traveling ahead of the first unmanned vehicle, the traffic congestion prediction unit predicts that a traffic congestion will occur due to the second unmanned vehicle when a distance between the first unmanned vehicle and the second unmanned vehicle is predicted to be less than or equal to a predetermined distance threshold after a predetermined time.

3. The unmanned vehicle management system according to claim 2, wherein
the first course data generation unit generates the first course data such that the first unmanned vehicle travels on the travel path at a first traveling speed.

4. The unmanned vehicle management system according to claim 3, wherein
the second course data generation unit generates the second course data such that the second unmanned vehicle travels on the travel path at a second traveling speed.

5. The unmanned vehicle management system according to claim 4, wherein
the second course data generation unit generates the second course data such that the second unmanned vehicle travels on the side path at the second traveling speed or a traveling speed lower than the first traveling speed.

6. The unmanned vehicle management system according to claim 4, wherein
the second course data generation unit generates the second course data such that the second unmanned vehicle stops on the side path.

7. The unmanned vehicle management system according to claim 2, wherein
the guidance command unit outputs a second guidance command such that the second unmanned vehicle enters the travel path from the side path after the first unmanned vehicle overtakes the second unmanned vehicle existing on the side path.

8. The unmanned vehicle management system according to claim 2, wherein
the first unmanned vehicle is an unmanned haul vehicle, and
the second unmanned vehicle is an unmanned water-spraying vehicle.

9. An unmanned vehicle management method comprising:
predicting occurrence of a traffic congestion from travel situations of a plurality of unmanned vehicles traveling on a travel path at a work site, the plurality of unmanned vehicles including a first unmanned vehicle and a second unmanned vehicle;
when occurrence of a traffic congestion is predicted, causing the second unmanned vehicle that causes the traffic congestion to enter a side path branching from the travel path;
generating first course data indicating a travel condition of the first unmanned vehicle; and
generating second course data indicating a travel condition of the second unmanned vehicle, wherein the second course data includes a travel course indicating a target travel route of the second unmanned vehicle, and the travel course is set on each of the travel path and the side path.

10. The unmanned vehicle management method according to claim 9, wherein
based on a travel situation of each of a first unmanned vehicle traveling on the travel path and a second unmanned vehicle traveling ahead of the first unmanned vehicle, it is predicted that a traffic congestion will occur due to the second unmanned vehicle when a distance between the first unmanned vehicle and the second unmanned vehicle is predicted to be less than or equal to a predetermined distance threshold after a predetermined time.

11. The unmanned vehicle management method according to claim 10, wherein
the first unmanned vehicle travels on the travel path at a first traveling speed based on first course data indicating a travel condition of the first unmanned vehicle, and
the second unmanned vehicle travels on the travel path at a second traveling speed based on second course data indicating a travel condition of the second unmanned vehicle.

12. The unmanned vehicle management method according to claim 11, wherein
the second unmanned vehicle travels on the side path at the second traveling speed or a traveling speed lower than the first traveling speed.

13. The unmanned vehicle management method according to claim 10, wherein
the second unmanned vehicle stops on the side path.

14. The unmanned vehicle management method according to claim 10, further comprising causing the second unmanned vehicle to enter the travel path from the side path after the first unmanned vehicle overtakes the second unmanned vehicle existing on the side path.

\* \* \* \* \*